United States Patent [19]
Roccaforte

[11] 3,990,574
[45] Nov. 9, 1976

[54] TAPE CASSETTE HUB RETAINERS

[75] Inventor: Harry I. Roccaforte, Western Springs, Ill.

[73] Assignee: Hoerner Waldorf Corporation, St. Paul, Minn.

[22] Filed: Oct. 28, 1975

[21] Appl. No.: 626,320

Related U.S. Application Data

[62] Division of Ser. No. 528,270, Nov. 29, 1974, Pat. No. 3,931,889.

[52] U.S. Cl. .............................. 206/387; 206/396; 206/397; 206/408; 206/493
[51] Int. Cl.² ...................................... B65D 85/672
[58] Field of Search .............. 229/9, 10, 11, 19, 20, 229/14 C; 206/387, 392, 395, 96, 97, 408, 491, 493, 495

[56] References Cited
UNITED STATES PATENTS

| | | | |
|---|---|---|---|
| 2,765,907 | 10/1956 | Dunning et al. | 206/396 |
| 2,818,974 | 1/1958 | Talbot | 206/392 |
| 2,938,625 | 5/1960 | Browning et al. | 206/392 |
| 3,233,728 | 2/1966 | Johnson et al. | 206/395 |
| 3,246,742 | 4/1966 | Coe | 206/408 |
| 3,258,116 | 6/1966 | Goerke | 206/392 |
| 3,319,866 | 5/1967 | Kitchell | 206/408 |
| 3,332,600 | 7/1967 | Guernsey | 229/20 |
| 3,381,810 | 5/1968 | Lasher et al. | 206/387 |
| 3,621,995 | 11/1971 | Francis | 206/392 |
| 3,684,084 | 8/1972 | Kanzelberger | 229/19 |

*Primary Examiner*—William Price
*Assistant Examiner*—Bruce H. Bernstein
*Attorney, Agent, or Firm*—Jerry F. Best

[57] ABSTRACT

A tape cassette hub retainer which may be used with different types of cartons, and which is adapted to engage and restrain the hubs of the cassette from movement during shipment. Small die cut flaps are located in a base panel directly beneath the cassette hubs and are foldable upwardly into a post configuration to engage the internal teeth in the hub of the cassette reels. An overlying support panel is provided having an opening through which the small flaps extend and which has a pair of side restraining flaps to hold the flaps from the base panel in upright position. In an alternate form, the overlying support panel is omitted.

2 Claims, 25 Drawing Figures

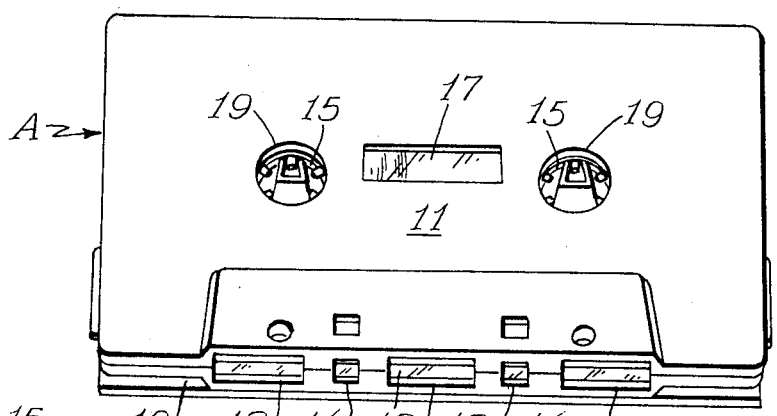
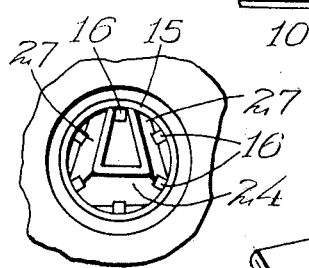
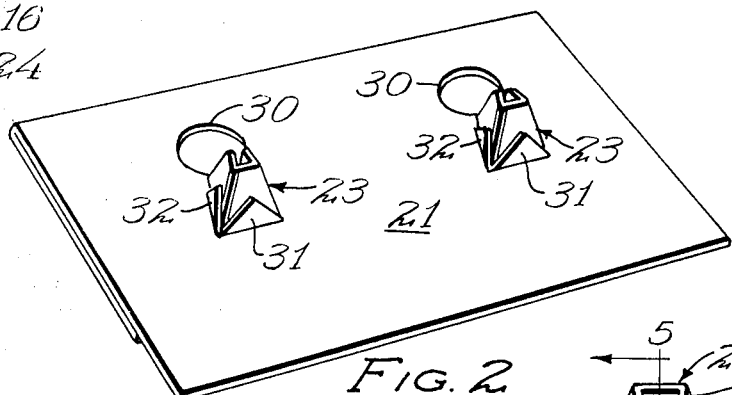
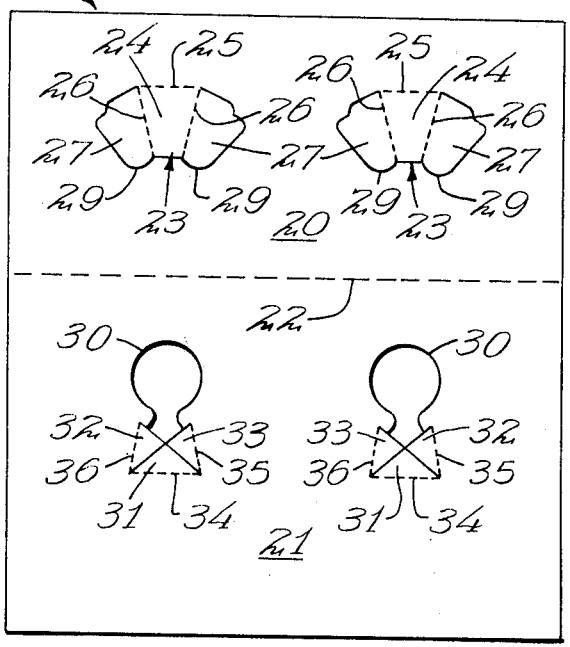
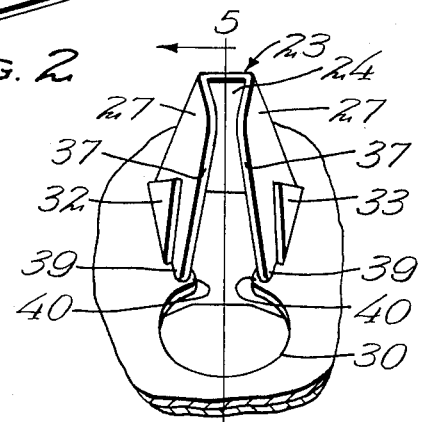
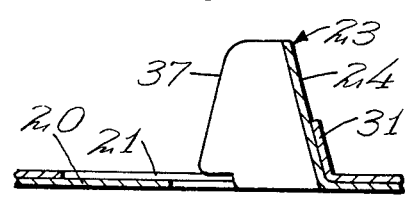

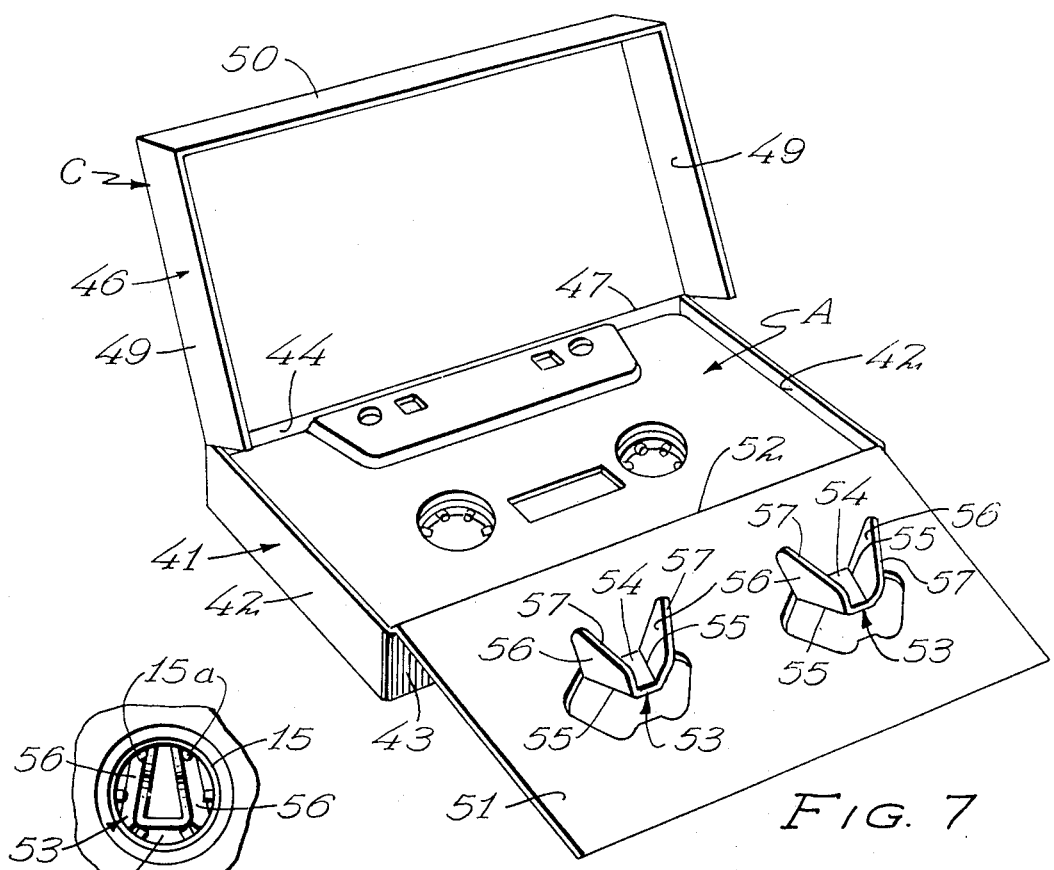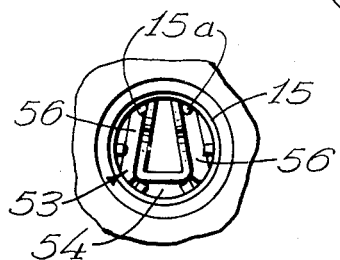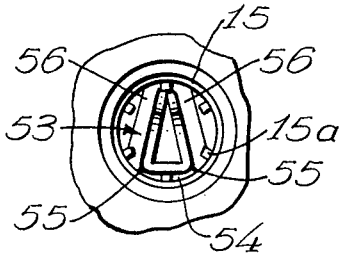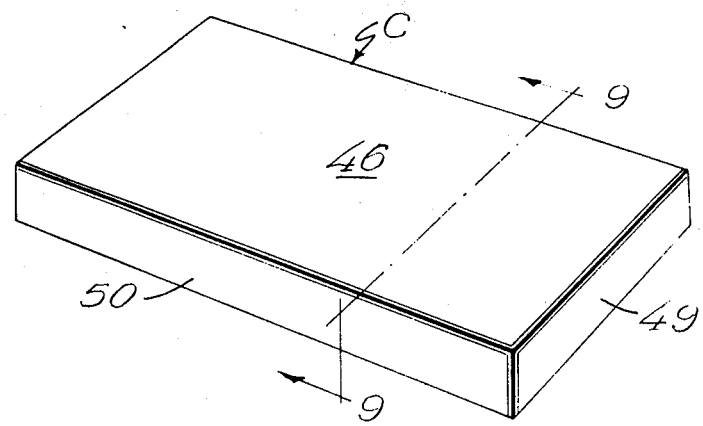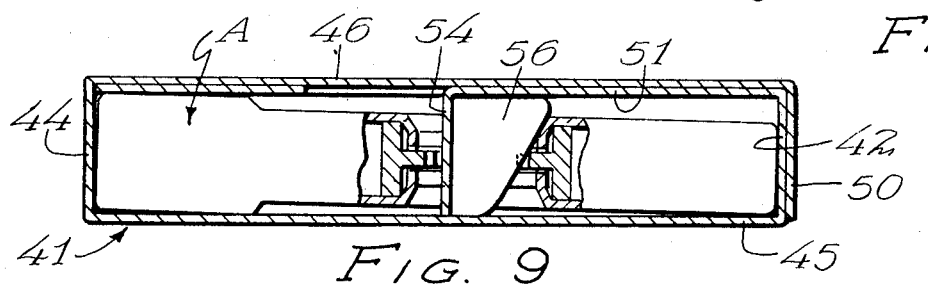

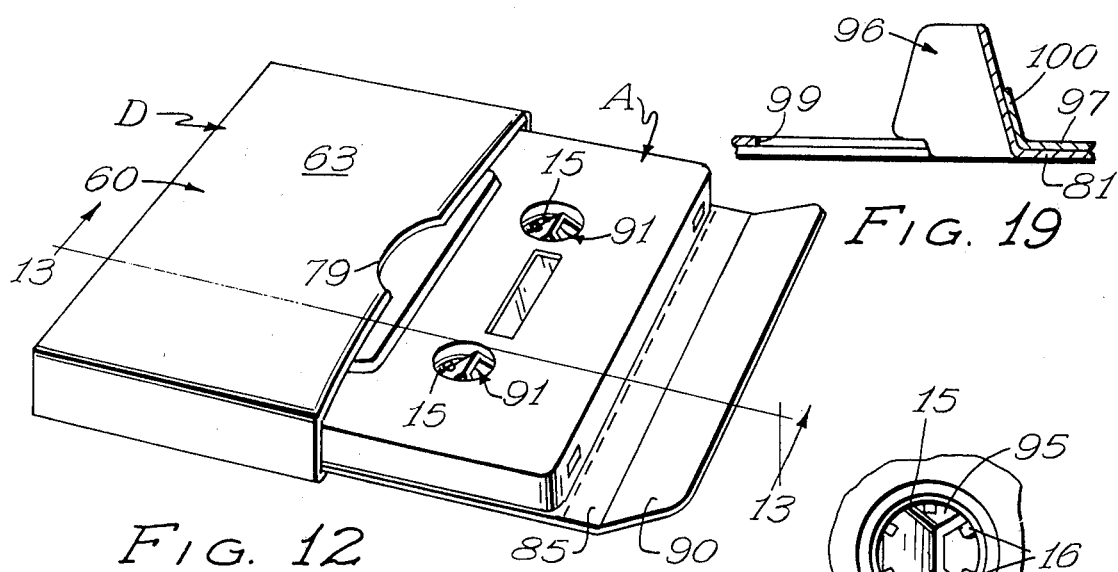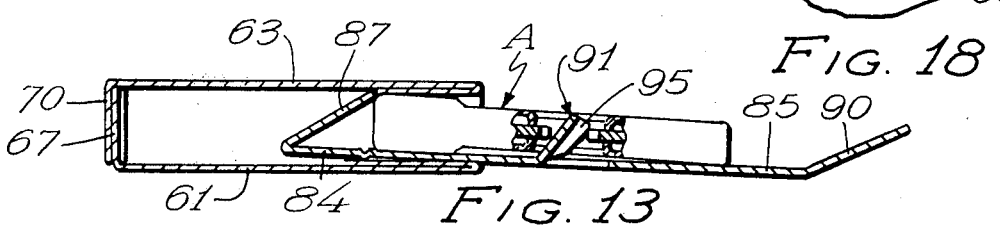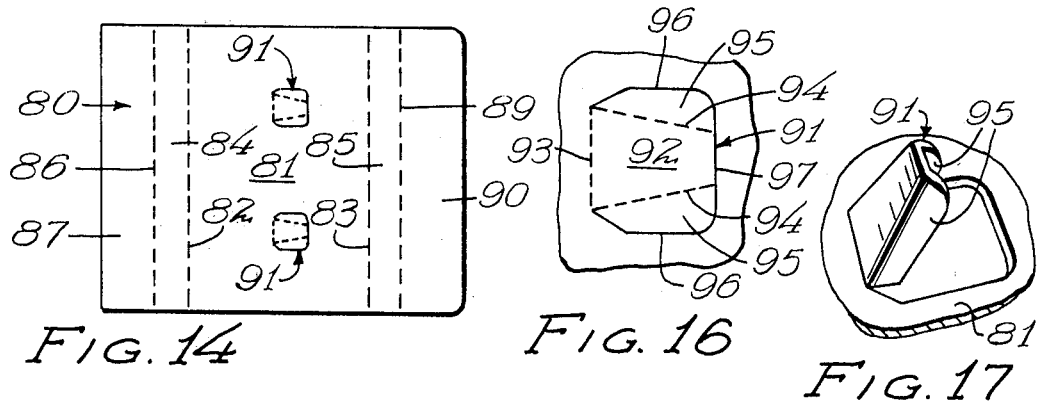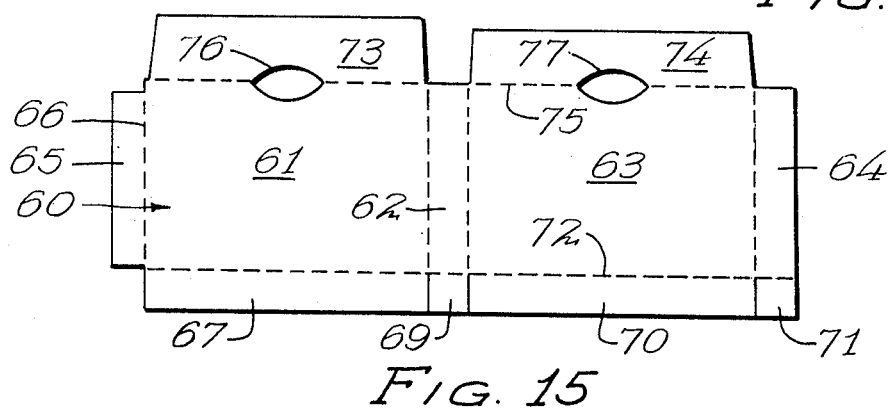

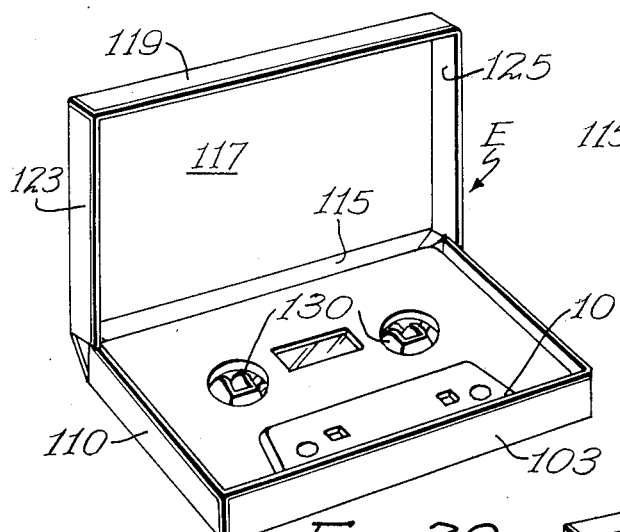
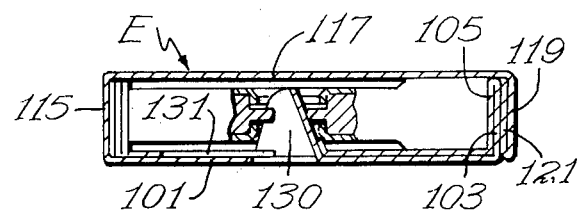
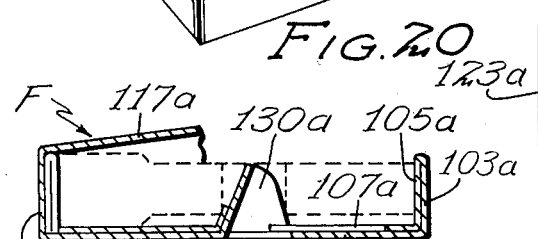
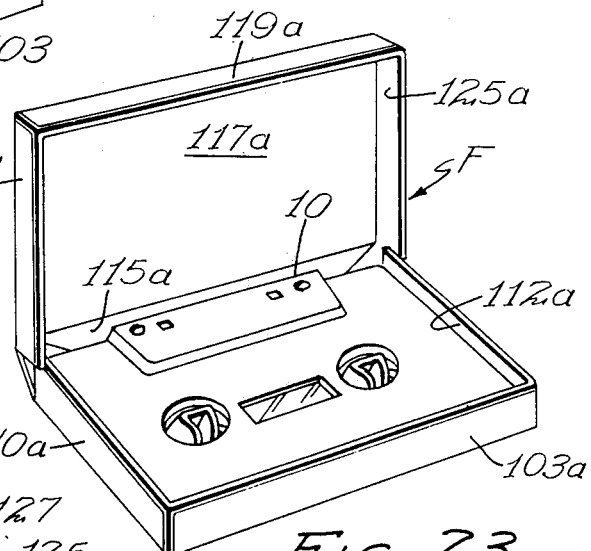
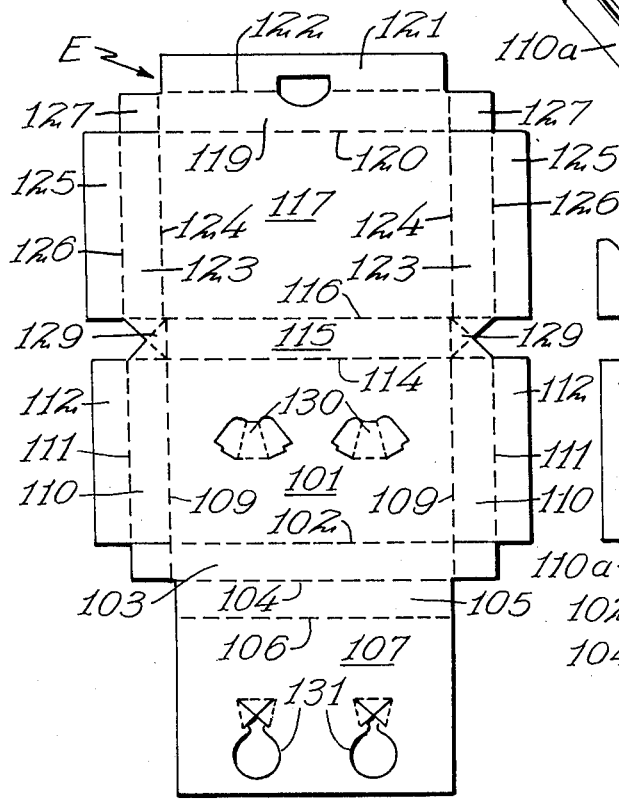
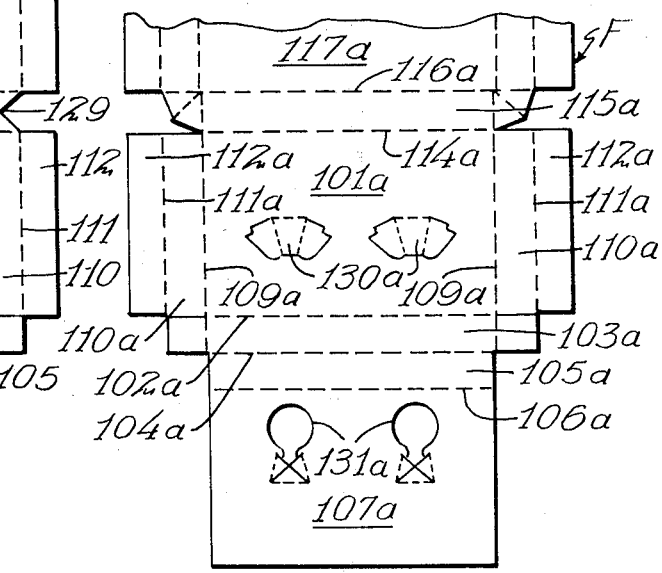

TAPE CASSETTE HUB RETAINERS

This is a division, of application Ser. No. 528,270, filed Nov. 29, 1974 now U.S. Pat. No. 3,931,889.

BACKGROUND OF THE INVENTION

1. Field of the Invention

This invention relates generally to packages for storage and shipment of tape cassettes, and more particularly to packages which have incorporated therein means for restraining the rotational movement of the reels within the tape cassette by engaging the hubs of the cassette.

2. Description of the Prior Art

The packaging of video and audio recording tapes in standardized plastic cassettes has become widespread throughout this country and has lead to a tremendous increase in their use due to their convenience since it is not necessary to physically handle the tape itself. The widespread use of portable tape players and automobile tape players has lead to the growth of sales of tape cassettes with prerecorded programs or songs on them. During shipment and storage of tape cassettes it is essential that the cassette be protected since a small portion of the tape is exposed on one side, and since through vibration and small spools of tape inside the cassette have a tendency to rotate unless restrained. If the tape is allowed to move and become loose and vibrate against itself, the recording quality is diminished and the tape may actually be damaged.

At the present time these tape cassettes are packaged in rigid plastic cases which have hinged lids and rigid plastic posts formed integrally thereon to engage the small spline in each of the hubs of the cassette reels to prevent rotational movement during shipping or storage. The expense associated with these individual rigid plastic containers is considerable, both because of fabrication costs, material costs and additional weight in shipment.

SUMMARY OF THE INVENTION

A paperboard cassette support adapted to be incorporated into a paperboard carton, said support including small die cut flaps foldable outwardly from the plane of the support to engage the internal teeth of the reels of the tape cassette. A second overlying panel has formed therein an aperture through which these flaps are passed, and the overlying panel has small restraining flaps to engage the flaps from the bottom panel and hold them in position when the tape cassette is removed. In an alternate form, the overlying panel is omitted.

BRIEF DESCRIPTION OF THE DRAWINGS

FIG. 1 is a perspective view of a tape cassette showing the supporting posts extending through the hubs to hold the hubs from rotation.

FIG. 2 is a perspective view of the support before the cassette is supported thereon.

FIG. 3 is a diagrammatic plan view of the blank from which the cassette support is formed.

FIG. 4 is a perspective view of one of the supporting posts in erected position.

FIG. 5 is a sectional view through one of the supporting posts, the position of the section being indicated by the line 5—5 of FIG. 4.

FIG. 6 is a top plan view of the supporting posts engaged in a hub of the cassette.

FIG. 7 is a perspective view of a modified form of construction.

FIG. 8 is a perspective view of the cassette container illustrated in FIG. 7 in closed position.

FIG. 9 is a sectional view through the container, the position of this section being indicated by the line 9—9 of FIG. 8.

FIG. 10 is a bottom plan view of a portion of the cassette looking upwardly toward one of the supporting posts in one position.

FIG. 11 is a view similar to FIG. 10 but showing the post engaging the teeth of the hub in another position.

FIG. 12 is a perspective view of another form of cassette container.

FIG. 13 is a sectional view, the position of the section beindicated by the line 13—13 of FIG. 12.

FIG. 14 is a diagrammatic plan view of a blank used to support the cassette in the construction illustrated in FIGS. 12 and 13.

FIG. 15 is a diagrammatic view of the blank used in forming the container used for containing the cassette as shown in FIGS. 12 and 13.

FIG. 16 is an enlarged view of the cassette retaining post.

FIG. 17 is a perspective view of the post shown in FIG. 16.

FIG. 18 is a plan view indicating the post of FIG. 17 engaged in the hub of a cassette.

FIG. 19 shows the container of FIGS. 12 and 13 with selfsustaining posts.

FIG. 20 is a perspective view of a cassette formed of one blank of paperboard.

FIG. 21 is a sectional view through the cassette of FIG. 20 in closed position thereof.

FIG. 22 is a diagrammatic view of the blank from which the cassette of FIGS. 20 and 21 is formed.

FIG. 23 is a view similar to FIG. 20 showing a form of cassette.

FIG. 24 is a sectional view of the cassette of FIG. 23 in closed position thereof.

FIG. 25 is a diagrammatic view of a partial blank from which the cassette of FIGS. 23 and 24 is formed.

DETAILED DESCRIPTION OF THE PREFERRED EMBODIMENTS

The tape cassette is constructed as is best illustrated in FIG. 1 of the drawings and is indicated in general by the letter A. The cassette is provided along one edge 10 which is at right angles to the top and bottom surfaces such as 11 with windows 12 through which the tape 13 is exposed. Intermediate small windows 14 may be provided in the cassette case edge 10 for use with different types of players.

The cassette hubs such as 15 are rotatably supported within the body of the cassette. These hubs 15 are provided with angularly spaced teeth 16 which are engageable with suitable posts on the recorder or cassette player for rotating the reels in one direction or another. A sight window 17 is provided between the hub apertures 19 in the walls 11 of the cassette container so that the peripheral edges of the rolls of tape may be viewed. By looking through the sight window 17, the relative amount of tape wound upon each of the hubs 15 may be noted, as obviously during playing or recording the size of the roll of tape on one hub increases while the size of the roll of tape on the other hub decreases.

The cassette holder shown in FIGS. 1 and 2 of the drawings is designed for insertion in an outer container such as a rectangular paperboard container which may be provided with a hinged cover, an open side or end, or may be placed in a telescope container. The outer container is not illustrated, but has the general appearance of the rectangular container illustrated in FIG. 8. The support B is divided into a lower panel 20 and an upper panel 21 by a transverse fold line 22. The panels 21 are preferably secured in face contact as shown in FIG. 2. A pair of supporting posts 23 are preferably die cut in spaced relation in the bottom panel 20, the posts 23 being spaced similarly to the hubs of the cassette A. The posts 23 include a trapezoidal center panel 24 which is hinged along its longer parallel edge 25 to the remainder of the panel 20. The tapering or converging sides of the trapezoidal center portion are connected along fold lines 26 to side flaps 27 which are generally trapezoidal in outline, three sides of the flaps being separated from the panel 20 along a generally J-shaped cut line 29, the ends of which are connected to the ends of the fold line 25 by cut lines 29a. The post 23 is designed to form generally a truncated frustum of a pyramid when folded out of the plane of the panel 20 in the manner indicated in FIGS. 2 and 4 of the drawings.

The top panel 21 is die cut to provide two generally circular apertures 30 which are designed to permit the post structures 23 to be inserted through the panel 21. Obviously the apertures 30 may be square, oval or otherwise shaped. Three triangular tabs or flaps 31, 32 and 33 are hingedly connected to the sheet 21 along angularly related fold lines 34, 35 and 36 respectively. These tabs are of isosceles triangular shape with the bases of the tabs connected to the sheet along the fold lines. The purpose of these tabs is to engage against the three sides of the truncated pyramidal posts 23 in the elevated position thereof.

FIGS. 4 and 5, as well as FIG. 2, show the posts 23 in elevated position. It will be noted that the triangular tabs 32 and 33 bear against the side wings such as 27 of the posts, while the intermediate triangular tab 31 engages against the intermediate wall 24. The free edges 37, as well as the junctures between the intermediate panel 24 and the side panels 27 of the post act to engage between the teeth of the cassette hubs to hold the same from rotation. As indicated in FIGS. 4 and 5 of the drawings, corners 39 of the post sides 27 are notched and are designed to rest upon the inwardly projecting ears 40 of the panel 21 so that the posts 23 tend to remain erect once they have been erected into the position shown. FIG. 6 of the drawings shows the manner in which the post extends through the hub 15 of a cassette and engages one or more of the teeth 16 on the inner surface of the hub.

FIGS. 7 through 18 of the drawings show structures having modified forms of posts which are not self-sustaining, and do not always remain in erected position when the posts are not engaged in the cassette A. In the construction shown in FIGS. 7 through 11, the cassette A is enclosed in a rectangular tray indicated in general by the numeral 41 which includes opposed parallel side walls 42 and opposed front and rear walls 43 and 44 which extend upwardly from a bottom panel 45 indicated in FIG. 9 of the drawings. As indicated in FIG. 7, a lid or cover 46 is hingedly connected to the rear wall 44 along a fold line 47. The lid 46 includes end walls 49 which are designed to enclose the end walls 42 of the tray, and a front wall 50 which is designed to overlay the front wall 43 of the tray. A panel 51 is foldably connected to the upper edge of the front wall 43 of the tray along a fold line 52. Supporting posts 53 are cut from the panel 51 and include a trapezoidal intermediate section 54 which is connected along converging fold lines such as 55 to side flaps or wings 56 having tapered edges 57 designed to engage within the hubs 15 of the cassette between the teeth 16 thereof. In this construction, the posts 53 are formed into truncated frustums of pyramids as in the previous construction.

The container is closed by first forming the posts 53 in right angular relation to the panel 51, and by folding the panel 51 along the fold line 52 and inserting the posts 53 into the hubs 15 of the cassette. Alternatively, the panel 51 may be folded over the cassette and the posts 53 plunged into the hubs 15.

FIGS. 10 and 11 indicate bottom views of the cassette within the container. FIG. 10 shows one position of a post 53 in which the side wings or flaps 56 engage between a pair of teeth 15a extending inwardly from the hub 15. FIG. 11 of the drawings shows a hub in a different angular position and with the fold lines 55 connecting the center portion 54 of the posts to the side wings 56 thereof engaging between the teeth 15a. It will be seen that in either rotated position of the hub 15, the post 53 will engage the teeth 16 and prevent rotation of the hub within the cassette.

When the panel 51 is in position overlying the cassette A, the lid 46 is closed, and the cassette holder C appears as indicated in FIG. 8 of the drawings. In this position it is shipped or stored.

The structure D shown in FIGS. 12 through 18 of the drawings is formed of the blanks indicated in FIGS. 14 and 15 of the drawings. The outer container 16 is formed of the blank indicated in FIG. 15. This blank includes a bottom wall 61, a side wall 62, a top wall 63, and a second side wall 64. A glue flap 65 is hingedly connected to the bottom panel 61 along the fold line 66, and is designed to be secured in face contact with the end wall 64 to complete the tubular carton.

Closure flaps 67, 69, 70 and 71 are connected to the walls 61, 62, 63 and 64 respectively along a common fold line 72. Reinforcing panels 73 and 74 are connected to the walls 61 and 63 along a common fold line 75. Generally oval shaped apertures 76 and 77 interupt the center portions of the fold lines 75, and are designed to form finger notches 79 in the edges of the carton.

In forming the carton 60, the flaps or reinforcing flanges 73 and 74 are folded along the fold lines 75 into contact with the bottom and top panels 61 and 63 to which they are hinged and are preferably secured thereto. This provides reinforced open edges on the container. The opposite side of the container is formed by folding inwardly the closure flaps 69 and 71, and then folding and securing the closure flaps 67 and 70 into overlapping relation to form a closure for the rear of the carton.

FIG. 14 of the drawings shows the blank used for retaining the cassettes which may be used with conjunction with the outer container 60. The blank 80 includes a bottom panel 81 hingedly connected along parallel fold lines 82 and 83 to a rear wall 84 and a front wall 85. The rear wall 84 is connected along the fold line 86 to a top flange 87. The front wall 85 is connected along the fold line 89 to a tuck flap 90.

Cassette retaining posts 91 are formed in the bottom panel 81 in proper spaced relation to engage into the hubs 15 of the cassette A. As indicated in FIGS. 16 and 17, the posts 91 each include a inner trapezoidal panel 92 connected along its longer parallel edge 93 to the remainder of the panel 91. The converging sides of the trapezoidal panel 92 are connected along the fold lines 94 to side flaps or wings 95 having cut edges 96 which engage the teeth 16 of the hub 15. All but the flaps forming the post are cut from the panel 81 by a generally U-shaped cut line 97. As a result, the posts 91 may be erected into position to extend into the hubs of the cassette, the trapezoidal flap or panel 92 inclining upwardly, and the flaps or wings 95 being folded inwardly to extend into the aperture in the hub. As indicated, the edges of the flaps or wings 95 engage the teeth 16 of the hub 15 as shown in FIG. 18.

In operation, the cassette A is placed upon the panel 81 with the posts 91 extending into the hubs 15 as indicated in FIG. 12. The rear and front walls 84 and 85 are folded up on opposite sides of the cassette A, and the flange 87 and tuck flap 90 are folded over the top of the cassette. In this position, the cassette is inserted into the hollow sided container 60.

When the cassette is pulled out from the container, the front wall 85 and tuck flap 90 are folded forwardly as indicated in FIG. 12 of the drawings and used to pull the cassette A forwardly. The flange 87 attached to the rear wall 84 engages the edge of the inwardly folded flange 74 secured beneath the top panel 63, and limits the outward movement of the blank 80 from the container 60. The cassette A may be lifted and drawn forwardly to remove the cassette from the package.

If desired, self-sustaining posts 96 may be used to engage the hubs of the cassette, the posts being similar to the posts 23 shown in FIGS. 4 and 5 of the drawings. This is accomplished by securing an upper panel 97 in face contact with the panel 81, and extending the posts 96 through suitable apertures 99 formed in the upper layer of the two-thickness panel as indicated in FIG. 19. Triangular supporting flaps or tabs 100 may be used to assist in holding the posts 96 in their erected form.

FIGS. 20, 21 and 22 show a modified construction in which the outer container is integral with the panels which hold the tape cassette. As indicated in FIG. 22, the outer container includes a bottom panel 101 hingedly connected along a fold line 102 to a front wall 103. The upper edge of the front wall 103 is connected by a fold line 104 to a front wall liner panel 105 which in turn is connected along a fold line 106 to a bottom liner panel 107.

The sides of the bottom panel 101 are connected along right angularly extended fold lines 109 to outer side walls 110 which in turn are connected along parallel fold lines 111 to side wall lining panels 112. Corner flaps 113 are hingedly connected to the ends of the fold line 109, and are folded between the side walls 110 and the side wall liner panels 112.

The bottom panel 101 is connected by a fold line 114 to a rear wall panel 115 which in turn is connected along a fold line 116 to the top panel 117. An outer front wall 119 is connected to the top panel 117 along the fold line 120, and a front wall liner panel 121 is connected to the front wall 119 along the fold line 122.

Side walls 123 are connected to the sides of the top wall 117 along fold lines 124, and side wall liner panels 125 are connected to the edges of the side walls 123 along the fold line 126. Corner flaps 127 are foldably connected to the sides of the front wall 119 and are folded between the side walls 123 and the side wall liner panels 125. Gussetted corner flaps 129 connect the side walls 110 of the bottom panel to the side walls 123 of the top panel 117.

It will be noted that the bottom panel 101 is provided with a series of three panels forming posts 130 which may be pushed through the apertures 131 in the overlying panel 107 to provide reinforcing flaps similar to those shown in FIGS. 1 to 5 of the drawings, and as shown in FIG. 19. These posts are designed to engage the hubs 15 of the cassette A when the edge 10 of the cassette is located along the front wall 103. In view of the fact that the posts 130 have already been described in detail, there appears to be no need for further explaining the construction.

As will be seen from FIGS. 20, 21 and 22, the cassette is a one-piece construction showing both the posts for accommodating the cassette hubs, and also comprising a complete enclosure. The container and cassette holder is indicated in general by the letter E for identification. If the openings in the bottom panel 101 are found to be objectionable, cassette identifying labels are secured to the undersurfaces of these panels 101 which conceals the two apertures.

In FIGS. 23, 24 and 25, a tape cassette holder and container is shown and identified in general by the letter F. The container and holder F is identical as that shown in FIGS. 20, 21 and 22 except for the position of the posts. In this latter construction, the posts are arranged so that the edge 10 of the cassette faces the rear of the container rather than the front wall as in FIG. 20. In view of this fact, similar identifying numerals have been applied to this structure F, the numerals being followed by the letter a.

As will be noted from a comparison of FIGS. 20 and 23, the cassette A has its edge 10 through which the tape is exposed facing rearwardly toward the rear wall 115a in FIG. 23 rather than forwardly toward the front wall as in FIG. 20. In other respects, the two structures are identical. Both structures are shown because some producers of tape cassettes like the cassettes arranged one way in the cassette holder while others like it in the other way.

In accordance with the Patent Statutes, I have described the principles of construction and operation of my improvement in TAPE CASSETTE HUB RETAINERS; and while I have endeavored to set forth the best embodiment thereof, I desire to have it understood that obvious changes may be made within the scope of the following claims without departing from the spirit of my invention.

I claim:
1. A tape cassette carton and hub retainer, said carton made from foldable paperboard or similar sheet-like material, said carton being an open end tube having rectangularly arranged top, bottom and side wall panels with a closure atone end only;

a tape cassette hub retainer insertable into said open end tube;

said retainer including a flat base panel, at least one die cut hinged post means formed in said base panel and spaced in said base panel to underlie at least one of the hubs in a tape cassette, said post means foldable outwardly from the plane of said base panel for engaging and retaining said hub of said tape cassette when in said carton;

said post means comprising a generally rectangular shape having three sections formed as a part thereof including a center section of generally triangular shape having as its base a hinge line connecting said post means to said base panel; and said three sections including a side flap hingedly connected to each of the two remaining sides of said center section, said three sections folded outwardly from the plane of said base panel into at least a frustum of a pyramid to engage and retain said hub of said tape cassette when in said container.

2. The carton and hub retainer of claim 1, including an inwardly folded flap hingedly attached to the open end of said top panel; and foldable wrap around flaps on both ends of said base panel, said wrap around flaps at said closed end engageable with said inwardly folded flap to prevent removal of said hub retainer from said carton.

* * * * *